March 28, 1939. H. E. YOUNG 2,152,126
HEATING DEVICE
Filed Oct. 2, 1936
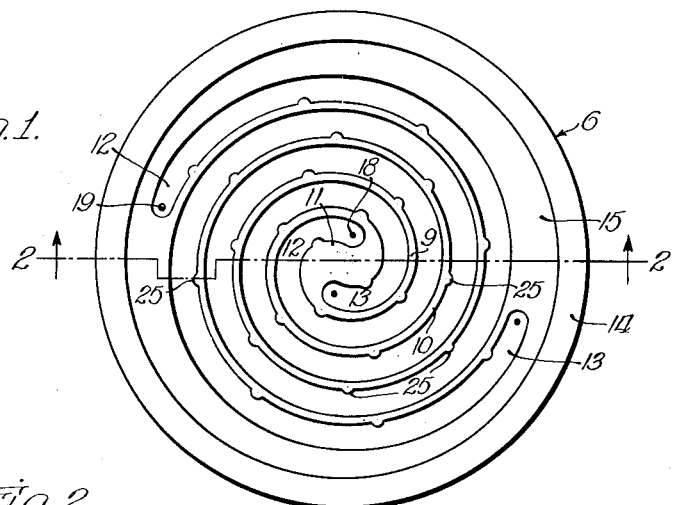
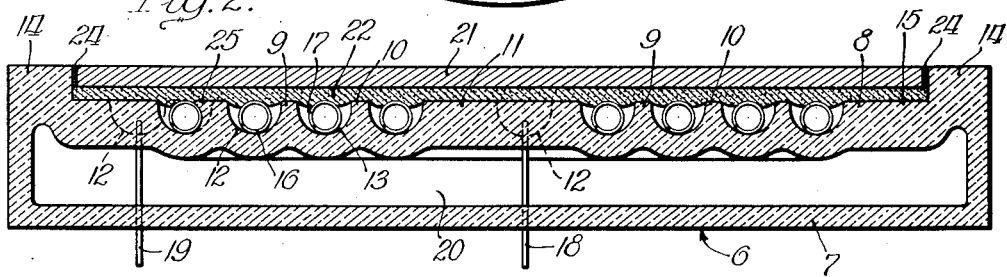
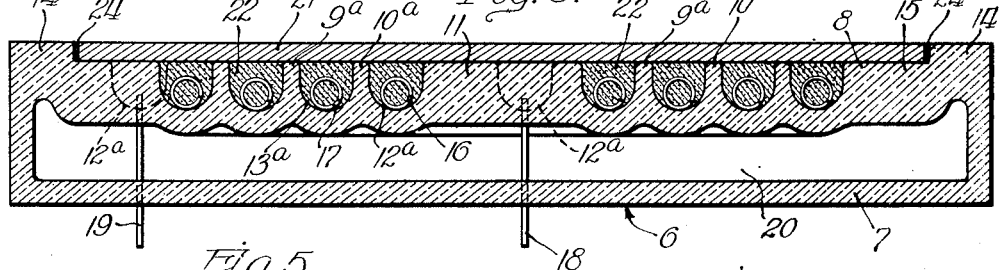
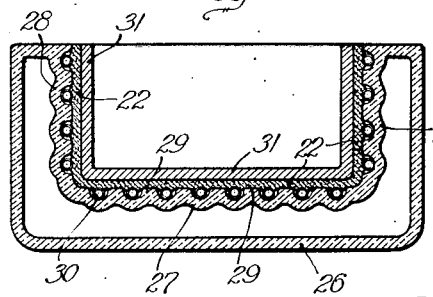
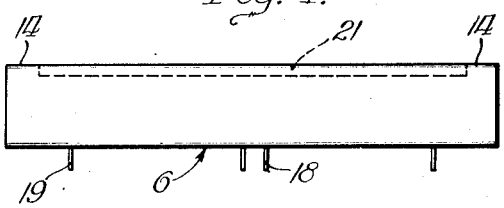
Inventor:
Hugh E. Young
By Mower Jackson Boucher
Dewer
Attys.

Patented Mar. 28, 1939

2,152,126

UNITED STATES PATENT OFFICE 2,152,126

HEATING DEVICE

Hugh E. Young, Chicago, Ill., assignor to John Wentworth, Chicago, Ill.

Application October 2, 1936, Serial No. 103,733

3 Claims. (Cl. 219—37)

This invention relates to heating devices, and has to do with what are commonly termed hot plates and analogous devices used in stoves for cooking and other purposes.

Among the objects of my invention are the provision of a device of the character stated which is not of objectionable weight, possesses adequate mechanical strength, is highly efficient as a thermal insulator for conserving the heat generated and applying it to best advantage and possesses improved heating characteristics. More specifically, my invention is directed to the provision of a heating device comprising a base member which is highly efficient as a heat and electrical insulator, this member being provided at one side thereof with electrical heating means and associated means of high heat conductivity effective for conducting the heat generated by the heating means to the object or material to be heated, the heat conducting means also preferably serving to guard the heat generating means against mechanical or other injury. Further objects and advantages of my invention will appear from the detail description.

In the drawing:—

Figure 1 is a plan view of the base member of the heating device embodying my invention;

Figure 2 is a sectional view of the complete heating device taken substantially on line 2—2 of Figure 1;

Figure 3 is a view similar to Figure 2 but showing a modification of the heating device;

Figure 4 is a side view of the complete heating device; and

Figure 5 is a central transverse vertical sectional view of a second modified form of heating device embodying my invention.

The device shown in Figures 1 and 2 comprises a disc-shaped hollow body or base member 6 the interior of which is closed to the atmosphere and sealed air tight. This base member is preferably formed of a non-porous material possessing high electrical insulating properties and being a poor conductor of heat. Glass is preferred and I preferably use what is known commercially as "Pyrex" glass, or a glass of similar characteristics, which has relatively great mechanical strength and a low coefficient of expansion. Base 6 may be produced by blowing or molding in a suitable mold, or in any other suitable known manner.

Bottom wall 7 of base member 6 may be flat, as shown, or of any other suitable shape. Top wall 8 is formed to provide two concentric ribs 9 and 10 extending spirally from a central hub 11 and defining spiral grooves 12 and 13. Each of these grooves terminates adjacent an upwardly projecting rim 14 extending above the periphery of the upper face of top wall 8, there being an annular thickened element 15 of wall 8, extending from rim 14 to the grooves 12 and 13 at the outer side of the outer convolutions of the grooves.

Groove 12 receives a coiled resistance element 16 formed of nicrome wire or any other suitable material. Groove 13 receives a similar resistance element 17. Terminal wires 18, formed of tungsten, platinum or any other suitable material having the same coefficient of expansion as the glass, pass through base member 6 from the bottom thereof and are secured to the inner ends of the resistance elements 16 and 17. These terminal wires may be inserted while the glass is in a plastic condition so as to be embedded in the base member 6 in such manner as to provide an air tight and pressure resistant closure about the respective wires, in a known manner, or they may be secured in the base member in any other suitable known manner. Terminal wires 19 are similarly secured through base member 6 and attached to the outer ends of the resistance elements 12 and 13. It will be understood that suitable leads are connected to the respective terminal wires and to a suitable source of electrical energy, through appropriate control devices or switches. If desired, and preferably, switches are provided and so arranged that the electrical resistance heating elements may be connected in series with each other, in multiple, or one only of the heating elements, selectively, may be connected in series with the associated circuit. This renders possible three different heating effects to suit various requirements, which is frequently desirable.

The base member 6, being hollow, defines a chamber 20 which, as stated, is sealed air tight. If this chamber contains air the base member 6 would be efficient as a heat insulator to prevent loss, by conduction and radiation downward, of heat generated by the resistance elements, since the dead air space within base member 6 is an efficient heat insulator. I prefer, however, to evacuate chamber 20 to a fairly high degree, by means of a suitable evacuating pump, after which the chamber is sealed air tight in a known manner effective to maintain the vacuum. This greatly increases the efficiency of the base member as a heat insulator and effectively prevents loss by radiation downward of any appreciable amount of the heat generated by the resistance elements.

A plate or disc 21 of high heat conductivity is disposed at the upper face of top wall 8 of the member 6. This plate is preferably formed of copper, although any other suitable material may be used, and is provided at its under face with a coating 22 of a material which is a poor conductor of electricity but a good conductor of heat, magnesium oxide being suitable for the purpose. Plate 21 seats upon ribs 9 and 10 and, at its outer portion, upon the relatively wide flat surface or shoulder provided by the upper face of element 15 of wall 8. Preferably, the edge of plate 21 is spaced inward a slight distance from rim 14, to accommodate expansion and contraction of the plate, and this space is closed by a suitable known sealing compound or cement 24. The magnesium oxide 22 extends downward into the grooves 12 and 13 about the resistance elements and between the convolutions thereof, this material also being in direct contact with copper plate 21. The magnesium oxide is thus in heat conducting relation to both the resistance elements and the copper plate for conducting heat to the latter, thus materially increasing the efficiency of the device for heating purposes.

The ribs 9 and 10 are preferably provided with spaced laterally projecting bosses 25 suitably shaped so as to extend partially over the resistance elements 16 and 17 for retaining them in the grooves 12 and 13, respectively, when these elements are applied to the base member. Since the copper plate 21 and the material 22 serve to retain the resistance elements in position, in the completely assembled device, the bosses 25 are not essential and may be omitted, though in certain instances they are preferred as facilitating placing of the resistance elements in the grooves.

The ribs 9 and 10, in addition to defining grooves for reception of the resistance elements, provide mechanical reinforcing or strengthening elements for top wall 8 of base member 6. It will further be noted that rim 14 is relatively thick at its juncture with the thickened annular element 15 of top wall 8. The plate 21 seats upon the ribs 9 and 10 and upon element 15 so that the load imposed upon this plate, by a cooking vessel or container, or other article, seating thereon, is distributed throughout a considerable area and is transmitted to the portions of top wall 8 best adapted for withstanding the load. The device is thus capable of safely supporting loads far in excess of those normally encountered in the ordinary use of a device of this character.

In the modified form of device illustrated in Figure 3 the ribs 9a and 10a are of increased height with resulting increased depth of the grooves 12a and 13a, respectively, the grooves are filled with magnesium oxide 22, or other suitable material which encloses the resistance elements and may extend between the convolutions thereof, and the copper plate 21 seats directly upon the tops of ribs 9a and 10a with its under surface in direct contact with the magnesium oxide 22. In all other respects the device of Figure 3 is similar to that of Figures 1 and 2 and need not be described in greater detail.

In the modification shown in Figure 5 the body member 26 is of cup-shape, defining a cylindrical recess, the top and inner walls 27 and 28, respectively, of member 26 being provided, at exposed surfaces, with ribs 29 defining grooves receiving electrical resistance heating elements 30. A single resistance element may be provided, or two of such elements may be used in the manner previously described in connection with Figures 2 and 3. In general, the arrangement of the grooves and the number of resistance elements may be widely varied, within limits, within the broad concept of my invention.

Preferably a metal liner 31, formed of copper or other suitable material of high heat conductivity, is disposed within the recess of member 26 and is insulated from the resistance elements by a layer or coating of magnesium oxide 22. In this form the container or vessel, the contents of which are to be heated, is placed within the liner 31 and is heated from the sides as well as the bottom, as will be clear. The member 26 effectively prevents loss of heat by radiation either downward or outward radially of the cylindrical recess of the device. In this manner the heat generated by the resistance elements is conserved and applied to best advantage so as to assure maximum heating efficiency.

Instead of providing terminal wires 18 and 19 extending through the base member, for effecting connections to the resistance elements, the latter may be connected to a source of electrical energy in any other suitable or known manner.

While I have illustrated, by way of example, several preferred embodiments of my invention, it will be understood that the heating device may be of any suitable form to meet requirements and that changes in construction and arrangement of parts thereof may be resorted to without departing from the field and scope of my invention. I intend to include in this applicatin all such variations, as fall within the scope of the appended claims.

I claim:

1. In a heating device of the character described, an evacuated flat hollow body of non-porous insulating material closed to the atmosphere and comprising a lower wall and an upper wall integrally connected to said lower wall, the marginal portion of said upper wall being thickened relative to said lower wall and the remainder of said upper wall being provided at its upper face with reinforcing ribs defining grooves, electrical resistance heating elements in said grooves, and a plate of high heat conductivity overlying said grooves in proximity thereto and supported at its marginal portion by said thickened marginal portion of said upper wall.

2. In a heating device of the character described, an evacuated hollow glass body closed to the atmosphere comprising a lower wall and an upper wall integrally connected to said lower wall, the marginal portion of said upper wall being thickened relative to said lower wall, the latter having a recess in its upper face extending into said marginal portion a substantial distance toward the periphery of said body, said upper wall having reinforcing ribs at its upper face defining grooves, electrical resistance heating elements in said grooves, and a heat conductive plate mounted in said recess overlying said grooves in proximity thereto and supported at its marginal portion by said thickened marginal portion of said upper wall.

3. In a heating device of the character described, an evacuated hollow glass body closed to the atmosphere comprising a lower wall and an upper wall integrally connected to said lower wall, said upper wall having a recess in its upper face and being provided within said recess with reinforcing ribs defining grooves at said upper face, electrical resistance heating elements in said grooves, a heat conductive plate mounted in said recess overlying said grooves in proximity thereto, and heat conductive electrical insulating material in contact with the under face of said plate and extending into said grooves into contact with said elements, said material being enclosed and shielded by said plate and said body.

HUGH E. YOUNG.